(12) United States Patent
Hoehne et al.

(10) Patent No.: US 9,712,300 B2
(45) Date of Patent: Jul. 18, 2017

(54) METHOD AND APPARATUS FOR REPORTING REFERENCE INFORMATION WITH RESPECT TO MULTIPLE CARRIERS OR MULTIPLE CELLS

(71) Applicant: Nokia Solutions and Networks Oy, Espoo (FI)

(72) Inventors: Hans Thomas Hoehne, Helsinki (FI); Alexander Sayenko, Espoo (FI); Karri Markus Ranta-Aho, Espoo (FI); Frank Frederiksen, Klarup (DK); Karol Drazynski, Wroclaw (PL); Petri Antero Jolma, Nurmijarvi (FI)

(73) Assignee: Nokia Solutions and Networks Oy, Espoo (FI)

( * ) Notice: Subject to any disclaimer, the term of this patent is extended or adjusted under 35 U.S.C. 154(b) by 294 days.

(21) Appl. No.: 14/375,468

(22) PCT Filed: Nov. 15, 2012

(86) PCT No.: PCT/EP2012/072712
§ 371 (c)(1),
(2) Date: Jul. 30, 2014

(87) PCT Pub. No.: WO2013/113419
PCT Pub. Date: Aug. 8, 2013

(65) Prior Publication Data
US 2015/0043542 A1 Feb. 12, 2015

(30) Foreign Application Priority Data
Jan. 30, 2012 (WO) .................. PCT/EP2012/051451

(51) Int. Cl.
*H04J 3/00* (2006.01)
*H04W 4/00* (2009.01)
(Continued)

(52) U.S. Cl.
CPC .......... *H04L 5/0048* (2013.01); *H04L 5/0091* (2013.01); *H04W 72/0406* (2013.01); *H04W 72/0413* (2013.01)

(58) Field of Classification Search
CPC ...................................................... H04L 5/0048
See application file for complete search history.

(56) References Cited

U.S. PATENT DOCUMENTS

2006/0274712 A1* 12/2006 Malladi .............. H04B 1/70735
370/345
2010/0027456 A1 2/2010 Onggosanusi et al. ....... 370/312
(Continued)

FOREIGN PATENT DOCUMENTS

CN 101978633 A 2/2011
CN 101978735 A 2/2011
(Continued)

OTHER PUBLICATIONS

3GPP TSG-RAN2#75bis, Oct. 10-14, 2011, Zhuhai, China, R2-115298, "Enhancement to UL signaling transmission", New Postcom, 4 pgs.
(Continued)

*Primary Examiner* — Gerald Smarth
(74) *Attorney, Agent, or Firm* — Harrington & Smith

(57) ABSTRACT

A method includes causing first reference information associated with a first cell or carrier and second reference information associated with a second cell or carrier to be sent to a first destination in a first time interval and causing at least third reference information associated with a third cell or carrier to be sent to a second destination in a different time interval.

19 Claims, 8 Drawing Sheets

(51) Int. Cl.
*H04L 5/00* (2006.01)
*H04W 72/04* (2009.01)

(56) References Cited

U.S. PATENT DOCUMENTS

| | | | | |
|---|---|---|---|---|
| 2010/0271970 A1* | 10/2010 | Pan | H04L 1/0026 370/252 |
| 2012/0140649 A1* | 6/2012 | Choudhury | H04W 24/10 370/252 |
| 2012/0176947 A1* | 7/2012 | Xi | H04L 1/0026 370/311 |
| 2013/0114577 A1* | 5/2013 | Cai | H04L 5/0053 370/336 |
| 2013/0194981 A1* | 8/2013 | Wang | H04L 1/1671 370/280 |

FOREIGN PATENT DOCUMENTS

| CN | 102131243 A | 7/2011 |
|---|---|---|
| CN | 102273252 A | 12/2011 |
| WO | WO 2010/048429 A2 | 4/2010 |
| WO | WO 2011/100646 A1 | 8/2011 |

OTHER PUBLICATIONS

3GPP TSG RAN WG1 Meeting #66bis, Zhuhai, China, Oct. 10-14, 2011, R1-113024, "Consideration on simultaneous tx/rx on different bands with different UL-DL configurations", Potevio, 7 pgs.

3GPP TR 25.872 V11.0.0 (Sep. 2011) $3^{rd}$ Generation Partnership Project; Technical Specification Group Radio Access Network; High Speed Packet Access (HSDPA) Multipoint Transmission (Release 11).

3GPP TSG RAN WG1 Meeting #67 *Multiflow Configuration Options* Nokia Siemens Networks; San Francisco, CA, USA, Nov. 14-18, 2011; R1-114151.

* cited by examiner

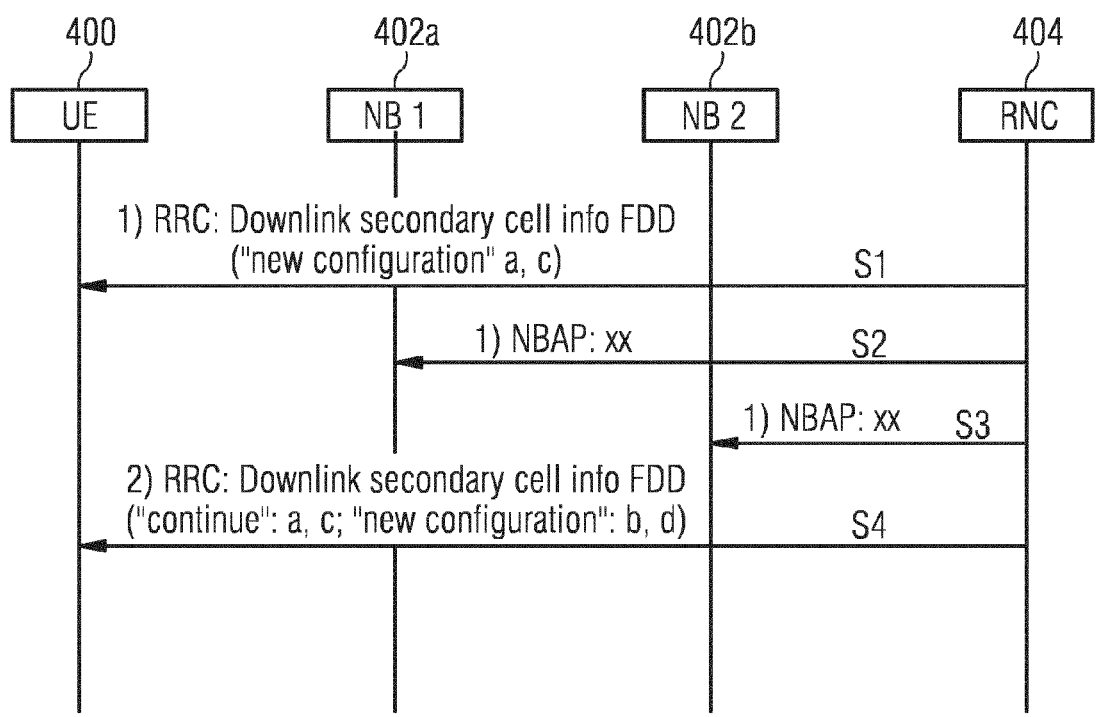

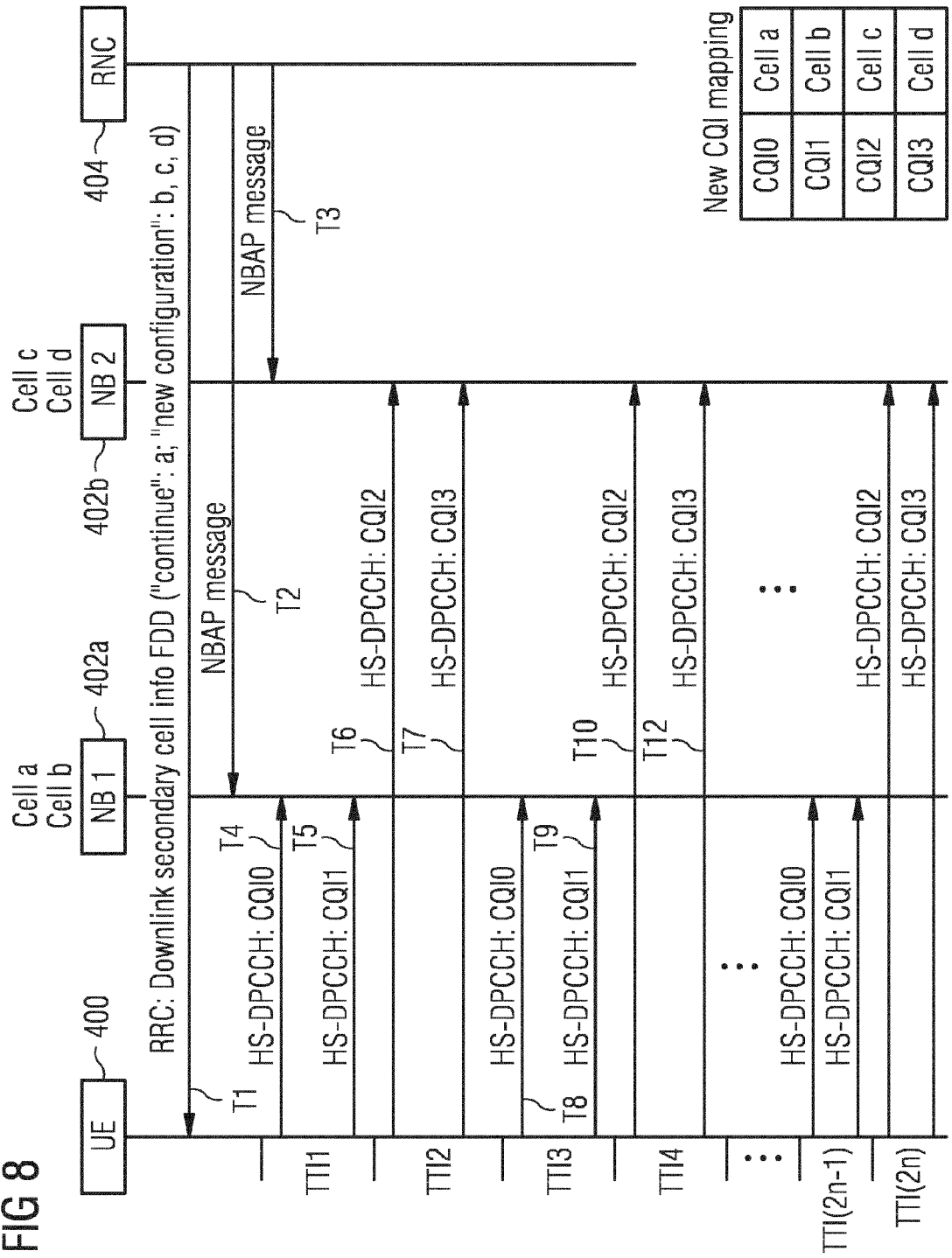

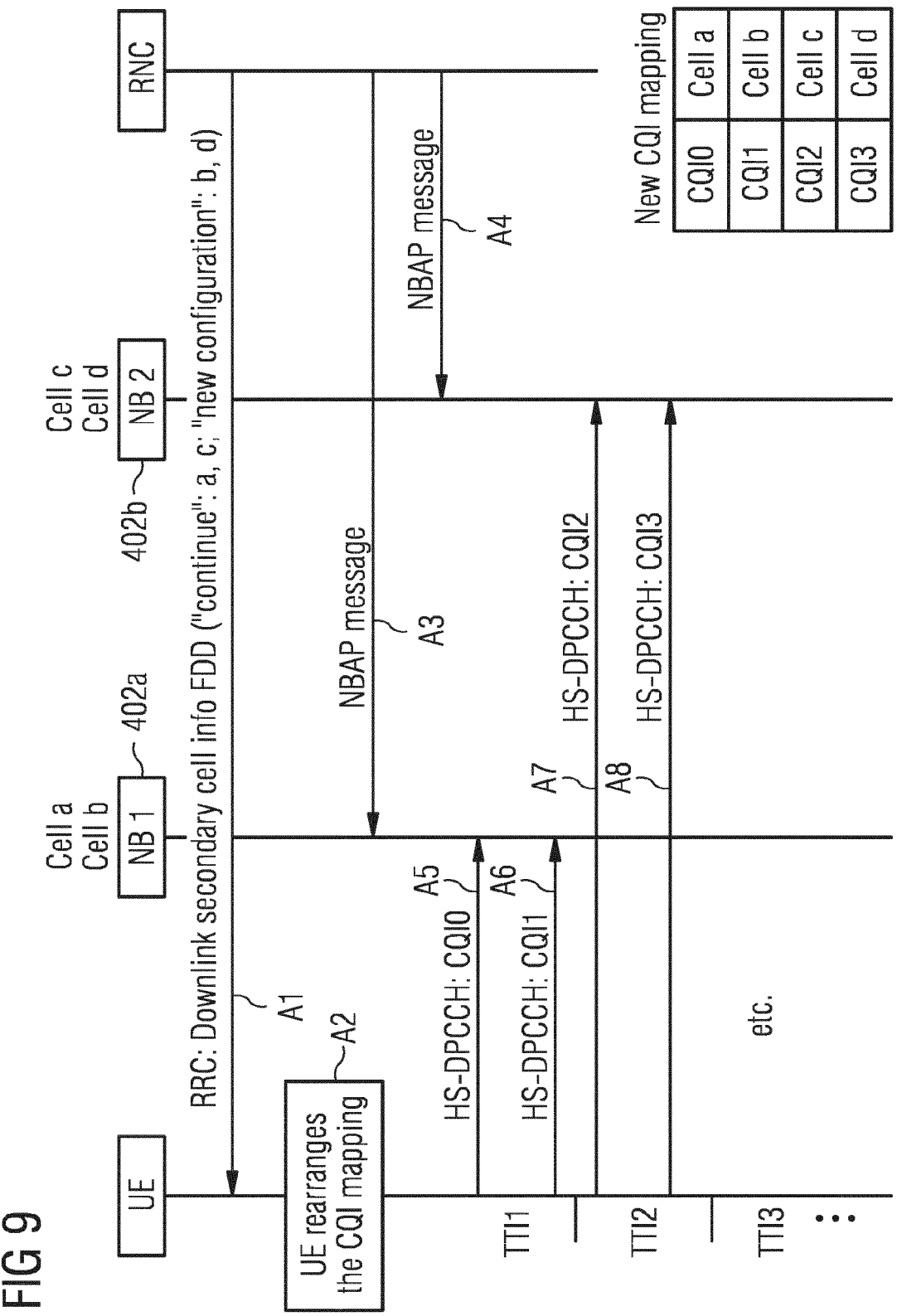

METHOD AND APPARATUS FOR REPORTING REFERENCE INFORMATION WITH RESPECT TO MULTIPLE CARRIERS OR MULTIPLE CELLS

Embodiments relate to a method and apparatus and in particular but not exclusively to a method and apparatus for the reporting or receiving reference information.

A communication system can be seen as a facility that enables communication sessions between two or more entities such as fixed or mobile communication devices, base stations, servers and/or other communication nodes. A communication system and compatible communicating entities typically operate in accordance with a given standard or specification. A communication can be carried on wired or wireless carriers. In a wireless communication system at least a part of the communication between at least two stations occurs over a wireless link.

Examples of wireless systems include public land mobile networks (PLMN) such as cellular networks, satellite based communication systems and different wireless local networks, for example wireless local area networks (WLAN).

A user can access the communication system by means of an appropriate communication device. A communication device of a user is often referred to as user equipment (UE) or terminal. Typically a communication device is used for enabling receiving and transmission of communications such as speech and data. In wireless systems a communication device provides a transceiver station that can communicate with another communication device such as e.g. a base station of an access network and/or another user equipment. The communication device may access a carrier provided by a station, for example a base station, and transmit and/or receive communications on the carrier.

An example of communication systems attempting to satisfy the increased demands for capacity is an architecture that is being standardized by the 3rd Generation Partnership Project (3GPP). The communication system is often referred to as Universal Mobile Telecommunications System (UMTS) radio-access technology with the enhancements for High Speed Packet Access (HSPA) which improves the downlink and uplink transmission (HSDPA, HSUPA), and the long-term evolution (LTE) of the Universal Mobile Telecommunications System (UMTS) radio-access technology. The HSPA and LTE enhancements aim to achieve various improvements, for example reduced latency, higher user data rates, improved system capacity and coverage, reduced cost for the operator and so on. A further development of the LTE is often referred to as LTE-Advanced. The various development stages of the 3GPP LTE and HSPA specifications are referred to as releases.

HDSPA includes a proposal for Multi flow MF transmission high speed downlink packet access (MF-HSDPA). In MF-HSDPA, the UE receives two or more high speed packet transmissions from two or more cells.

According to an aspect, there is provided a method comprising: causing first reference information associated with a first cell or carrier and second reference information associated with a second cell or carrier to be sent to a first destination in a first time interval and causing at least third reference information associated with a third cell or carrier to be sent to a second destination in a different time interval.

The first and second destinations may comprise first and second base stations.

The method may comprise receiving information on said cells or carriers, said information indicating which cells belong to which destination.

The method may comprise receiving information on a position for said reference information in a channel.

The method may comprise causing said reference information to be reported in an order in which an associated cell or carrier has been configured.

The method may comprise determining which cells or carriers are associated with which destination.

One or more of scrambling information, cell timing information or information identifying an associated destination may be used in order to determine which cells are associated with which destination.

The time intervals may comprise transmission at time intervals.

The reference information may comprise channel quality indicator information.

The causing may comprise causing said reference information to be sent on a control channel.

The same control channel may be used to send said information to the first and second destinations.

A first control channel may be used to send information to the first destination and a second control channel may be used to send information to the second destination.

The method may comprise receiving information, and reconfiguring one or more links with one or more cells or carriers, responsive to said information.

The method may comprise receiving information indicating an order for said cells or carriers.

The method may comprise responsive to deactivation of one or more of said cells or carriers, causing a discontinuous transmission to be provided instead of reference information associated with said deactivated cell or carrier.

According to another aspect, there is provided a method comprising: deactivating one of a plurality of cells or carriers: and providing reference information for at least one of said cells or carriers and for said deactivated cell providing reference information associated with an active one of said plurality of cells or carriers, and/or provide discontinuous transmission of said reference information.

According to another aspect, there is provided a method comprising: deactivating one of a plurality of cells or carriers; and coding said reference information for at least one of said cells or carriers in a second manner, said reference information being coded in a first way prior to said deactivating.

The reference information may be coded across two slots after said deactivating.

The method may be performed in a user equipment.

According to another aspect, there is provided a method comprising: causing information to be sent to a user equipment to control reference information reporting by said user equipment such that said user equipment report reference information associated with a first cell or carrier and second reference information associated with a second cell or carrier to be sent to a first destination in a first time interval and causing at least third reference information associated with a third cell or carrier to be sent to a second destination in a different time interval.

The method may comprise information indicating an order of configuration of said cells or carriers.

The method may comprises configuring one or more cells or carriers, reconfiguring one or more cells or carriers and/or continuing with a configuration of one or more carriers.

The method may comprise sending one or more messages to one or more of said destinations.

The method may comprises causing said user equipment to report said reference information in the order in which said cells or carriers were configured.

The method may be performed by a radio network controller.

According to another aspect, there is provided a method comprising: receiving information reference information from a user equipment such that said reference information is receiving in a first time interval and comprises reference information associated with a first cell or carrier and second reference information associated with a second cell or carrier.

The method may be performed by a base station.

According to another aspect, there is provided a computer program comprising computer executable instructions which when run cause the any one of the above methods to be performed.

According to another embodiment, there is provided apparatus comprising: means for causing first reference information associated with a first cell or carrier and second reference information associated with a second cell or carrier to be sent to a first destination in a first time interval and causing at least third reference information associated with a third cell or carrier to be sent to a second destination in a different time interval.

The first and second destinations may comprise first and second base stations.

The apparatus may comprise means for receiving information on said cells or carriers, said information indicating which cells belong to which destination.

The apparatus may comprise means for receiving information on a position for said reference information in a channel.

The comprising means may be for causing said reference information to be reported in an order in which an associated cell or carrier has been configured.

The apparatus may comprise means for determining which cells or carriers are associated with which destination.

One or more of scrambling information, cell timing information or information identifying an associated destination may be used in order to determine which cells are associated with which destination.

The time intervals may comprise transmission at time intervals.

The reference information may comprise channel quality indicator information.

The causing means may be for causing said reference information to be sent on a control channel.

The same control channel may be used to send said information to the first and second destinations.

A first control channel may be used to send information to the first destination and a second control channel may be used to send information to the second destination.

The apparatus may comprises means for receiving information configured to reconfigure one or more links with one or more cells or carriers.

The apparatus may comprise means for receiving information indicating an order for said cells or carriers.

The causing means may be, responsive to deactivation of one or more of said cells or carriers, for causing a discontinuous transmission to be provided instead of reference information associated with said deactivated cell or carrier.

An apparatus comprising at least one processor and at least one memory including computer code for one or more programs, the at least one memory and the computer code configured, with the at least one processor, to cause the apparatus at least to: cause first reference information associated with a first cell or carrier and second reference information associated with a second cell or carrier to be sent to a first destination in a first time interval and causing at least third reference information associated with a third cell or carrier to be sent to a second destination in a different time interval.

The first and second destinations may comprise first and second base stations.

The at least one memory and the computer code may be configured, with the at least one processor, to cause the apparatus to receive information on said cells or carriers, said information indicating which cells belong to which destination.

The at least one memory and the computer code may be configured, with the at least one processor, to cause the apparatus to receive information on a position for said reference information in a channel.

The at least one memory and the computer code may be configured, with the at least one processor, to cause the apparatus to cause said reference information to be reported in an order in which an associated cell or carrier has been configured.

The at least one memory and the computer code may be configured, with the at least one processor, to cause the apparatus to determine which cells or carriers are associated with which destination.

One or more of scrambling information, cell timing information or information identifying an associated destination may be used in order to determine which cells are associated with which destination.

The time intervals may comprise transmission at time intervals.

The reference information may comprise channel quality indicator information.

The at least one memory and the computer code may be configured, with the at least one processor, to cause the apparatus to cause said reference information to be sent on a control channel.

The same control channel may be used to send said information to the first and second destinations.

A first control channel may be used to send information to the first destination and a second control channel may be used to send information to the second destination.

The at least one memory and the computer code may be configured, with the at least one processor, to cause the apparatus to receive information configured to reconfigure one or more links with one or more cells or carriers.

The at least one memory and the computer code may be configured, with the at least one processor, to cause the apparatus to receive information indicating an order for said cells or carriers.

The at least one memory and the computer code may be configured, with the at least one processor, to cause the apparatus, responsive to deactivation of one or more of said cells or carriers, to cause a discontinuous transmission to be provided instead of reference information associated with said deactivated cell or carrier.

A user equipment may comprise an apparatus as described above.

According to another aspect, there is provided apparatus comprising: means for causing information to be sent to a user equipment to control reference information reporting by said user equipment such that said user equipment report reference information associated with a first cell or carrier and second reference information associated with a second cell or carrier to be sent to a first destination in a first time interval and causing at least third reference information associated with a third cell or carrier to be sent to a second destination in a different time interval.

An apparatus comprising at least one processor and at least one memory including computer code for one or more programs, the at least one memory and the computer code configured, with the at least one processor, to cause the apparatus at least to: cause information to be sent to a user equipment to control reference information reporting by said user equipment such that said user equipment report reference information associated with a first cell or carrier and second reference information associated with a second cell or carrier to be sent to a first destination in a first time interval and causing at least third reference information associated with a third cell or carrier to be sent to a second destination in a different time interval.

The apparatus may be provided in a radio network controller.

According to another aspect, there is provided an apparatus comprising: means for receiving information reference information from a user equipment such that said reference information is receiving in a first time interval and comprises reference information associated with a first cell or carrier and second reference information associated with a second cell or carrier.

According to another aspect, there is provided an apparatus comprising at least one processor and at least one memory including computer code for one or more programs, the at least one memory and the computer code configured, with the at least one processor, to cause the apparatus at least to: receive information reference information from a user equipment such that said reference information is receiving in a first time interval and comprises reference information associated with a first cell or carrier and second reference information associated with a second cell or carrier.

The apparatus may be provided in a base station.

Embodiments will now be described, by way of example only, with reference to the following examples and accompanying drawings, in which:

FIG. 7 shows a signal flow of an initial configuration and reconfiguration of user equipment;

FIG. 8 shows a signal flow in a reconfiguration to a dual frequency four carrier according to an embodiment;

FIG. 9 shows a signal flow in a reconfiguration to a dual frequency four carrier according to another embodiment;

In the following certain exemplifying embodiments are explained with reference to a wireless or mobile communication system serving mobile communication devices. Before explaining in detail the exemplifying embodiments, certain general principles of a wireless communication system, access systems thereof, and mobile communication devices are briefly explained with reference to FIGS. 1 to 3 to assist in understanding the technology underlying the described examples.

Figure 1:
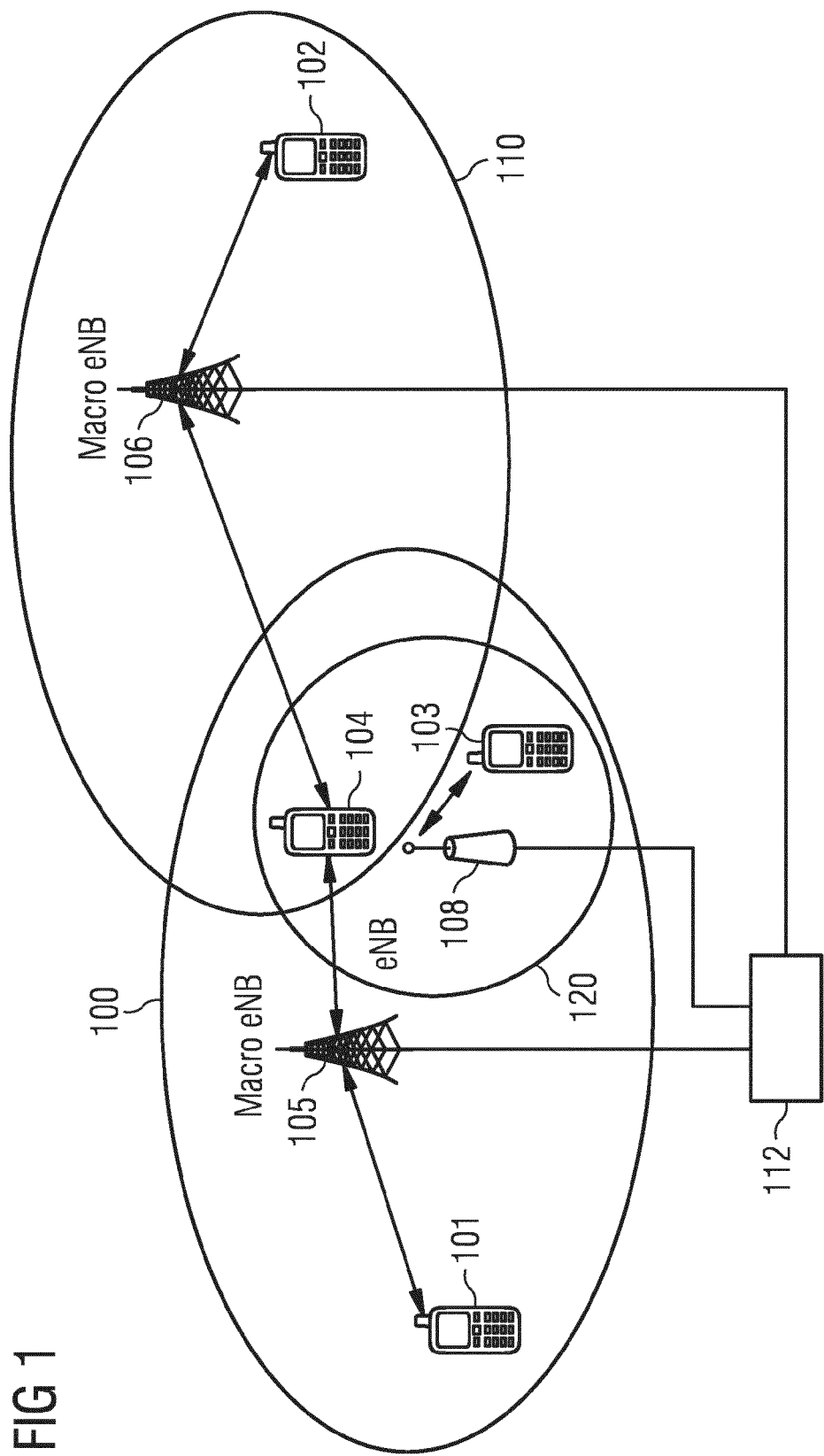
FIG. 1 shows a schematic diagram of a network according to some embodiments.

A mobile communication device or user equipment 101, 102, 103, 104 is typically provided wireless access via at least one base station or similar wireless transmitter and/or receiver node of an access system. In FIG. 1 three neighbouring and overlapping access systems or radio service areas 100, 110 and 120 are shown being provided by base stations 105, 106, and 108.

However, it is noted that instead of three access systems, any number of access systems can be provided in a communication system. An access system can be provided by a cell of a cellular system or another system enabling a communication device to access a communication system. A base station site 105, 106, 108 can provide one or more cells. A base station can also provide a plurality of sectors, for example three radio sectors, each sector providing a cell or a subarea of a cell. All sectors within a cell can be served by the same base station. A radio link within a sector can be identified by a single logical identification belonging to that sector. Thus a base station can provide one or more radio service areas. Each mobile communication device 101, 102, 103, 104, and base station 105, 106, and 108 may have one or more radio channels open at the same time and may send signals to and/or receive signals from more than one source.

Base stations 105, 106, 108 may be controlled by a radio network controller RNC 112 so as to enable operation thereof and management of mobile communication devices 101, 102, 103, 104 in communication with the base stations 105, 106, 108. The function of the RNC may be distributed between a plurality of entities. Although not shown in FIG. 1 in some embodiments, each base station 105, 106 and 108 can have at least part of the RNC function.

The cell borders or edges are schematically shown for illustration purposes only in FIG. 1. It shall be understood that the sizes and shapes of the cells or other radio service areas may vary considerably from the similarly sized omnidirectional shapes of FIG. 1.

In particular, FIG. 1 depicts two wide area base stations 105, 106, which can be macro-NBs (node B) 105, 106. The macro-NBs 105, 106 transmit and receive data over the entire coverage of the cells 100 and 110 respectively. FIG. 1 also shows a smaller base station or access point which in some embodiments can be a pico NB 108. The coverage of the smaller base station 108 may generally be smaller than the coverage of the wide area base stations 105, 106. The coverage provided by the smaller node 108 overlap with the coverage provided by the macro-NBs 105, 106. In some embodiments, the smaller node can be a femto or Home NB. Pico NBs can be used to extend coverage of the macro-NBs 105, 106 outside the original cell coverage 100, 110 of the macro-NBs 105, 106. The pico NB can also be used to provide cell coverage in "gaps" or "shadows" where there is no coverage within the existing cells 100, 110 and/or may serve "hot spots".

It should be noted that in some embodiments the pico NB or smaller NBs may not be present. In alternative embodiments, only pico or smaller NBs may be present. In some embodiments there may be no macro NBs.

The communication devices 101, 102, 103, 104 can access the communication system based on various access techniques, such as code division multiple access (CDMA), or wideband CDMA (WCDMA). Other examples include time division multiple access (TDMA), frequency division multiple access (FDMA) and various schemes thereof such as the interleaved frequency division multiple access (IF- DMA), single carrier frequency division multiple access (SC-FDMA) and orthogonal frequency division multiple access (OFDMA), space division multiple access (SDMA) and so on.

Some non-limiting examples of the recent developments in communication systems are the High Speed Packet Access (HSPA) for uplink and downlink transmission or long-term evolution (LTE) of the Universal Mobile Telecommunications System (UMTS) that is being standardized by the 3rd Generation Partnership Project (3GPP). As explained above, further development of the LTE is referred to as LTE-Advanced.

Non-limiting examples of appropriate access nodes are a base station of a cellular system, for example what is known as NodeB (NB) in the vocabulary of the 3GPP specifications. The LTE employs a mobile architecture known as the Evolved Universal Terrestrial Radio Access Network (E-UTRAN). Base stations of such systems are known as evolved Node Bs (eNBs) and may provide E-UTRAN features such as user plane Radio Link Control/Medium Access Control/Physical layer protocol (RLC/MAC/PHY) and control plane Radio Resource Control (RRC) protocol terminations towards the user devices. Other examples of radio access system include those provided by base stations of systems that are based on technologies such as wireless local area network (WLAN) and/or WiMax (Worldwide Interoperability for Microwave Access).

Although not shown in FIG. 1, a base station may provide a plurality of cells.

Figure 2:
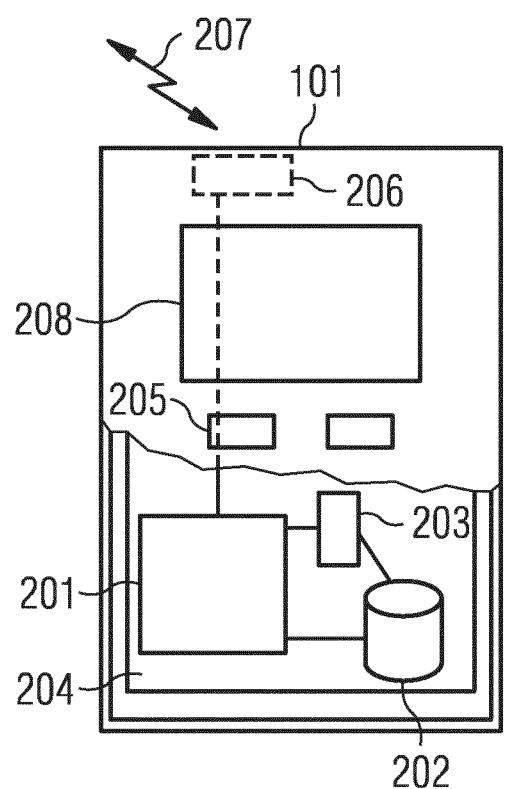
FIG. 2 shows a schematic diagram of a mobile communication device according to some embodiments.

The communication devices will now be described in more detail in reference to FIG. 2. FIG. 2 shows a schematic, partially sectioned view of a communication device 101 that a user can use for communication. The communication device may be a mobile communication device. A communication device is often referred to as user equipment (UE) or terminal. An appropriate communication device may be provided by any device capable of sending and receiving radio signals. Non-limiting examples include a mobile station (MS) such as a mobile phone or what is known as a 'smart phone', a portable computer provided with a wireless interface card or other wireless interface facility, personal data assistant (PDA) provided with wireless communication capabilities, or any combinations of these or the like. A communication device may provide, for example, communication of data for carrying communications such as voice, electronic mail (email), text message, multimedia and so on. Users may thus be offered and provided numerous services via their communication devices. Non-limiting examples of these services include two-way or multi-way calls, data communication or multimedia services or simply an access to a data communications network system, such as the Internet. A user may also be provided broadcast or multicast data. Non-limiting examples of the content include downloads, television and radio programs, videos, advertisements, various alerts and other information.

The user equipment 101 may receive signals over an air interface 207 via appropriate apparatus for receiving and may transmit signals via appropriate apparatus for transmitting radio signals. In FIG. 2 transceiver apparatus is designated schematically by block 206. The transceiver apparatus 206 may be provided for example by means of a radio part and associated antenna arrangement. The antenna arrangement may be arranged internally or externally to the mobile device.

The user equipment is also typically provided with at least one data processing entity 201, at least one memory 202 and other possible components 203 for use in software and hardware aided execution of tasks it is designed to perform, including control of access to and communications with access systems and other communication devices. The data processing, storage and other relevant control apparatus can be provided on an appropriate circuit board and/or in chipsets. This feature is denoted by reference 204.

The user may control the operation of the user equipment by means of a suitable user interface such as a key pad 205, voice commands, touch sensitive screen or pad, combinations thereof or the like. A display 208, a speaker and a microphone can be also provided. Furthermore, a user equipment may comprise appropriate connectors (either wired or wireless) to other devices and/or for connecting external accessories, for example hands-free equipment, thereto.

Figure 3A:
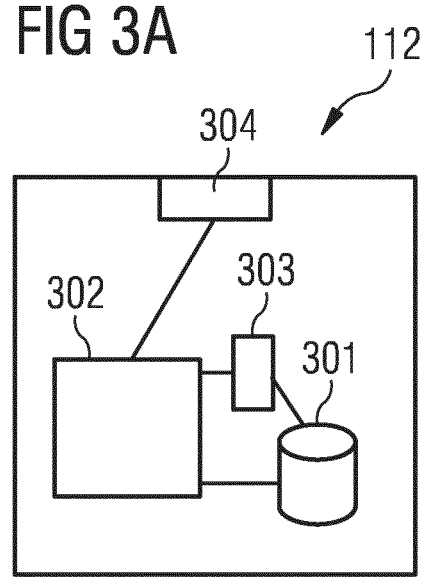
FIG. 3a shows a schematic diagram of a radio network controller according to some embodiments.

FIG. 3a shows an example of the RNC 112. The RNC 112 comprises at least one memory 301, at least one data processing unit 302, 303 and an input/output interface 304. Via the interface the RNC can be coupled a plurality of base stations. The RNC 109 can be configured to execute an appropriate software code to provide control functions.

Figure 3B:
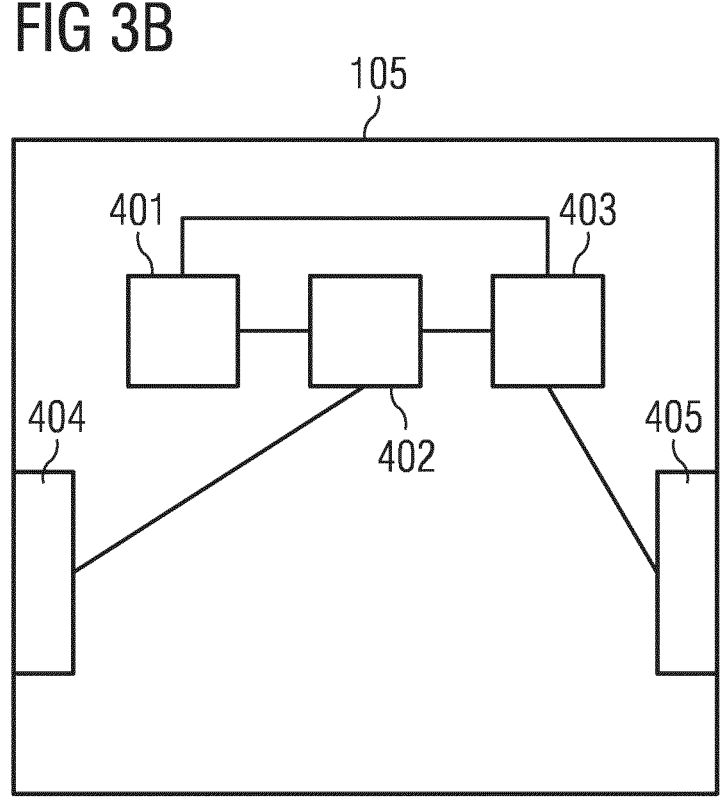
FIG. 3b shows a schematic diagram of a base station according to some embodiments.

Reference is made to FIG. 3b which shows a base station 105. The base station comprises at least one memory 401 and at least one data processing unit 402 and 403. The base station is provided with a first interface 404 for interfacing with the RNC. The base station is provided with a second interface 405 which is a wireless interface for interfacing with user equipment.

Some embodiments may be in the context of multi-point transmission. Multi-point transmission is where data is scheduled from more than one transmission point. The transmission points may comprise two base stations, may comprise different cells of the same base station or different carriers of the same base station. The cells may operate on same or different carriers.

One multi-point transmission scheme, referred to as Multiflow, is where the application level- or RLC-level- or MAC-level-data is split into several flows. In inter-site MF the data is split in the RNC at the level of RLC (radio link control) and in intra-site MF in the NodeB at the level of MAC (media access control)-(e) hs.

In 3GPP, a carrier corresponds to a cell, and in non-MF HSDPA, reference can be made to a dual- or quad-carrier network while in fact the feature may be specified as "dual cell". In MF-HSPDPA, there may two cells on one frequency. In the context of 3GPP a carrier often is a cell, however in other contexts a carrier refers to a frequency. In non-MF multicarrier (multi carrier MC) HSDPA cells on different frequencies belonging to one NodeB characterized by common timing, are aggregated. In MF-HSDPA cells belonging to different NodeBs may be aggregated.

Each flow is sent from a different cell (of the same and/or different base stations).

In HSPA, Multiflow data splitting may take place in the RLC (radio link control) layer at the RNC. It may also take place in the MAC, if the Multiflow configuration allows to do so, e.g. in intra-site Multiflow where both cells are controlled by the same NodeB. Embodiments will be described in the context of 3GPP HSDPA Multiflow. However, it should be appreciated that embodiments may have more general application both in the 3GPP context but also in other wireless systems. In the context of LTE, some embodiments may be also used for inter-site carrier aggregation or LTE Coordinated Multi-Point transmission (CoMP) where one LTE base station coordinates the transmissions over one or more transmission paths p1, ... pn, n>0, to a mobile station UE, e.g., transmission paths via different cells or different base stations NBs or different carriers of the same cell or different carriers of different cells.

Some embodiments may be thus be used with HSDPA-MF. Some embodiments relate to the RL (radio link) configuration procedures and in particular the position of the CQIs (Channel Quality Indicator) in the uplink control channel. Some embodiments may additionally or alternatively be relevant also to HS-SCCH (high speed shared control channel) orders issued by NodeBs. HS-SCCH orders are commands sent by NodeBs to the UE that are transparent to the RNC. In MF they may also be transparent to the other NodeB. The UE therefore needs to understand which cells a NodeB's commands are referring to. This can be done by coordinating among the NodeBs, or by telling the UE the cell-NodeB mappings. The HS-SCCH orders in question may relate to DTx/DRx, and to cell (de)activation.

In MF-HSDPA, the CQI of the assisting cells and/or ACKs need to be transmitted by the UE in the uplink. This is similar to the way that the CQI needs to be transmitted for other multi-carrier scenarios. A CQI is information signalled by a user equipment to a base station to indicate a suitable data rate. This may for example be a modulation and a coding scheme value. This data rate is the data rate to be used by the base station for downlink transmissions. A user equipment may select a CQI based on a measurement of the received downlink signal to interference plus noise ratio and/or knowledge of the user equipment's receiver characteristics.

Currently, two possibilities for uplink control format are under discussion. In a first proposal (proposal one) shown in FIG. 10b, multi-carrier based CQI formats are provided where all information is carried on one HS-DPCCH (HS-DPA UL dedicated physical control channel). The HS-DPCCH carries CQIs and ACKs (acknowledgments—AKN).

Figure 10A:
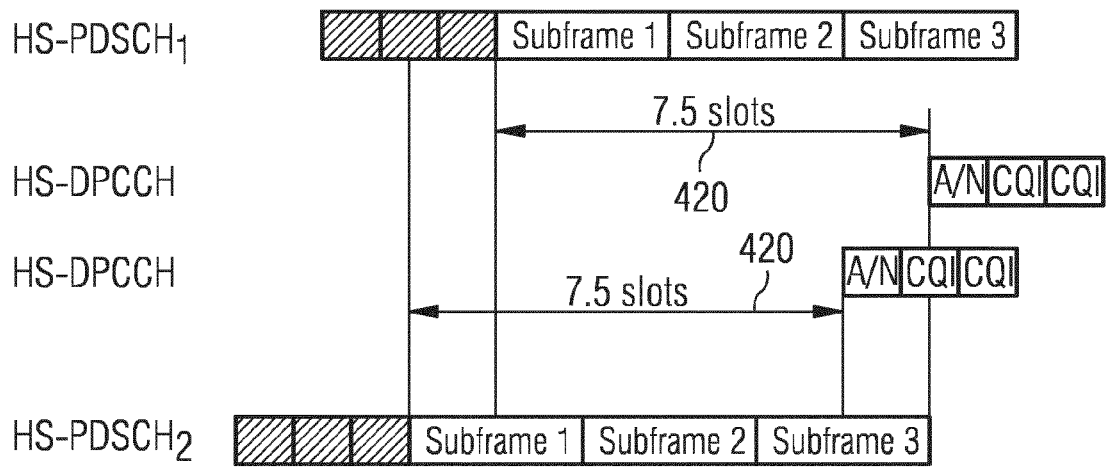
FIG. 10a shows a dual HS-DPCCH arrangement.
Figure 10B:
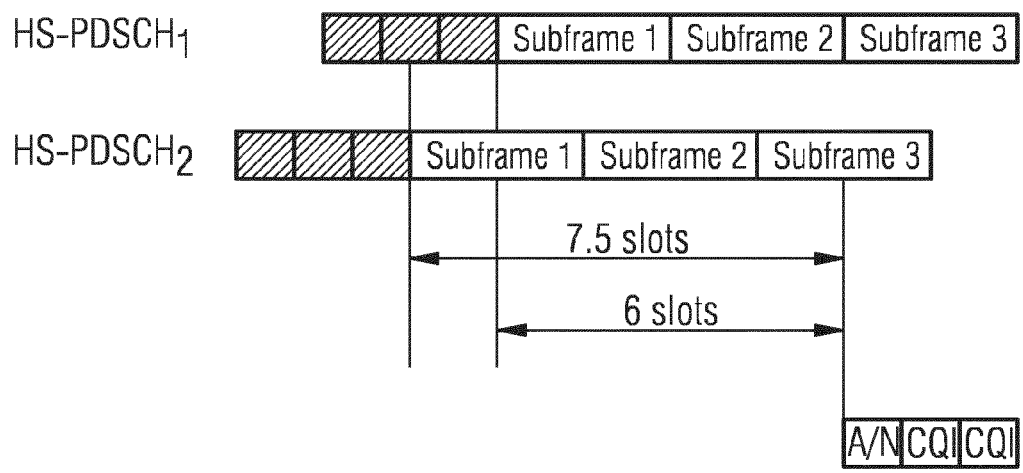
FIG. 10b shows a single HS-DPCCH arrangement.

FIG. 10b shows the HS-DPCCH (High Speed-Dedicated Physical Control Channel) for each NodeB. The HS-DPCCH carries acknowledgment information and current channel quality indicator (CQI) of the user. This value is then used by the base station to calculate how much data to send to the user devices on the next transmission. The High Speed-Physical Downlink Shared Channel (HS-PDSCH) is the channel that carries actual user data. As shown in FIG. 10b, one of these channels is provided for each NodeB.

In one proposal, eight carrier HSDPA provides two HS-DPCCHs. One channel uses the I symbols of a channelization code and the other channel uses the Q symbols of that channelization code.

Another proposal (proposal two) is shown in FIG. 10a and uses two H-DPCCHs with time bases, reference 420 aligned to that of the Multiflow participating NodeBs. The two HS-DPCCHs would each carry the CQI information of the respective NodeB. The HS-PDSCHs are as shown in FIG. 10b.

For multi-carrier non-Multiflow option there will be a primary cell and several secondary cells. Multi-carrier non-Multiflow HSDPA has all cells time-aligned, and that there is one primary cell. In contrast Multiflow aggregates the cells of two NodeBs, each of which can be ordinarily a multicarrier site, and as in HSDPA there is no site-timing requirement also the Multiflow cells may or may not be time-aligned. In multi-carrier HSDPA the primary cell appears as first CQI 0. The secondary cells appear as CQIs 1 . . . n where n is the number of secondary cells. In embodiments, the number of secondary cells can be 0 or more.

Figure 4:
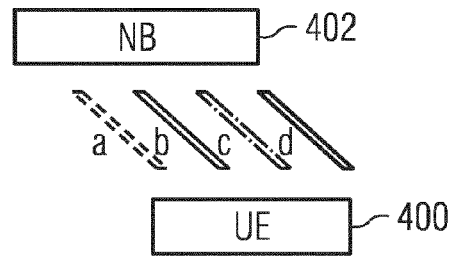
FIG. 4 shows an example of a HSDPA quad carrier configuration.

Reference is made to FIG. 4 which shows an example of a quad carrier configuration. As shown in FIG. 4 there is provided a UE 400 which is configured to communicate with a NodeB. In the example shown, four cells referenced a, b, c and d are shown. Each cell is respectively associated with a CQI, 0 . . . 3.

Figure 5:
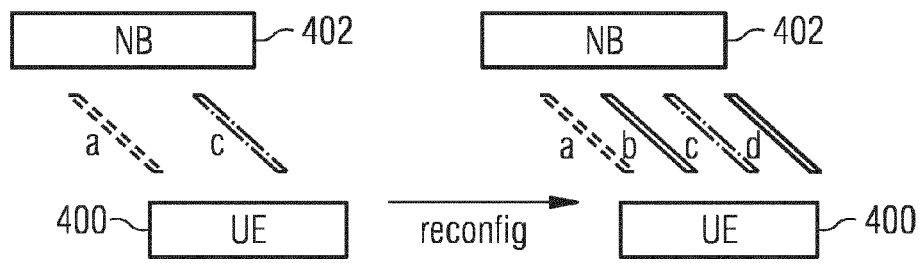
FIG. 5 shows an example of a HSDPA dual carrier reconfiguration to a HSDPA quad carrier.

Reference is now made to FIG. 5 which illustrates the reconfiguration from a dual carrier to a quad carrier. In the example shown in FIG. 5, the secondary CQIs will refer to the cells or carriers in the order in which they were configured. For example, initially, the UE has cells a and c of the NodeB 402. After reconfiguration, the user equipment would have cells a, c, b, d of the NodeB 402.

Figure 6:
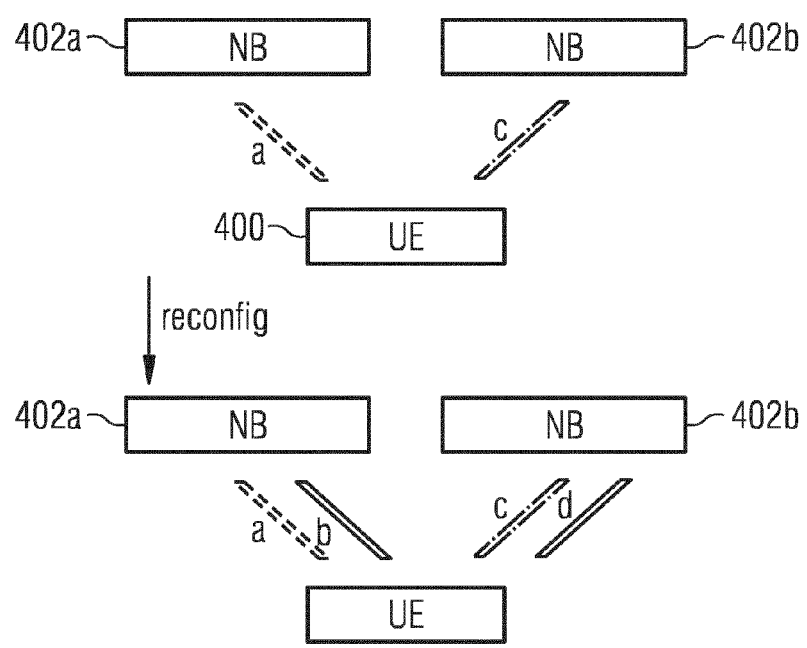
FIG. 6 shows an example of single frequency dual cell (SF-DC) reconfiguration to a dual frequency four cell (DF-4C) configuration.

Reference is made to FIG. 6 which shows the changing from an SF-DC (single frequency-dual cell), this being a Multiflow variant, to a DF-4C (dual frequency quad cell), again a Multiflow variant. Initially, the user equipment 400 has a first cell a with a first NodeB 402a and a second cell c with a second NodeB 402b. After reconfiguration, the user equipment would have cells a and b with the first NodeB 402a and cells c and d with the second NodeB 402b. The CQI mapping would thus change from a, c to a, c, b, d.

Reference is made to FIG. 7 which shows an example signalling flow diagram for a reconfiguration. In step S1, the RNC 404 sends to the user equipment a RRC (radio resource control) message. This message is a downlink secondary cell information FDD (frequency division duplexing) message indicating a new configuration for cells a and c. This is to set up the connection to cells a and c.

In step S2, the RNC sends an NBAP (NodeB application part) message to the first NodeB 402a with the configuration information which has been provided to the UE, for this NodeB. It should be appreciated that in some embodiments, the RNC provides full Multi flow carrier configuration to a UE, and only the relevant carrier information to each NodeB.

In step S3, the RNC sends an NBAP message to the second NodeB 402b again containing the new configuration information for the second NodeB 402b. It should be appreciated that steps S1, S2, S3 and S4 can take place in either order or at the same time, depending on the configuration activation timing. Note that for synchronized procedures, configurations may contain information when the configuration becomes active. For unsynchronized configuration procedures, the activation time is immediately upon reception. For unsynchronized configuration procedures, it is the responsibility of the sending entity to time and thereby synchronize the messages to achieve the desired reconfiguration effect and their purpose is to speed up reconfiguration at the expense of possibly lost data because of possible reconfiguration mismatch between entities.

In step S4, the RNC sends a RRC (Radio Resource Control) message to the UE. This is a downlink secondary cell information FDD message which indicates that the UE should continue with cells a and c and provides new configuration information for cells b and d. This is to additionally add cells b and d to the cells being used.

A number of CQI formats may require the CQI to be multiplexed over one or more two or more TTIs (transmission time intervals). A 4-CQI report may be transmitted in the uplink in TTI1 and TTI2. For example, in TTI 1, CQI0 and CQI1 may be transmitted. In TTI 2, CQI2 and CQI3 may be transmitted. In the previously discussed Multiflow case of for example FIG. 6, this would mean that the CQIs of cells a and c are transmitted in TTI1 and cells b and d are transmitted in TTI 2. This would mean that every TTI would require the Node to update the CQI information of the UE, even if a better configuration would allow updating the complete information only every other TTI. In other words, each node B is receiving one CQI every TTI from the UE.

Further, in some embodiments, the mapping of CQIs to the TTI sequence number should be known to the NodeBs. This may be assumed to be the case or be known already for scenarios such as continuous packet connectivity. Common knowledge of the timing base may be established by the RNC via the CFN (connection frame number). Determining of the exact modulus i.e. even or odd CFN for the start of the 2-TTI CQI report might require clarification in some embodiments. With the second proposal of designing the UL feedback for Multiflow with two HS-DPCCH, the user equipment needs to know which CQI should be placed into which HS-DPCCH. In other words, a user equipment needs to know which cell belongs to which NodeB.

In some embodiments, an RNC will configure cells in a sequence that will result in CQIs of cells belonging to the same NodeB occurring clustered (grouped) or ordered in the HS-DPCCH.

Alternatively or additionally, regardless of the order of cells conveyed to the user equipment in the RRC RL (radio link) configuration message, the user equipment will arrange the CQI to occur clustered for the respective NodeBs in the HS-DPCCH, in for example proposal one (one HS-DPCCH for Multiflow feedback). In proposal two, the user equipment NodeB will cluster the CQIs in the respective HS-DPCCHs.

Alternatively or additionally, for technologies that have time division access, the CQIs will be sorted according to the required uplink power or last measured downlink RSSI (received signal strength indicator). This may be used particularly with proposal one.

Reference will now be made to FIG. 8 which shows a signal flow for reconfiguration to a dual frequency—4 cell (DF-4C) configuration. This is in an embodiment where the RNC configures cells in a sequence that will result in CQIs of cells belonging to the same NodeB occurring clustered or ordered in the HS-DPCCH. In this scenario, the RNC may configure all links. The RNC may re-send the full configuration for a particular carrier. However, if this is at the same logical position inside the RRC message, then this is not a new configuration. However, should the same full configuration appear at a different logical position, then this is treated as a new configuration. In some embodiments, the RNC may provide a full set of new carrier configuration(s) when changing modes. In step T1, the RNC sends to the user equipment an RRC message. The message is the downlink secondary cell information FDD message. The message indicates that the UE should continue with cell a and sends new configuration information for cells b, c and d. In some embodiments, the downlink secondary cell info FDD may replace an existing information element or not. In other words, the choice is either new configuration or continue with current configuration. In embodiments, the reconfiguration is done in an incremental fashion, where only the changed or modified values are indicated or where the change is indicates relative to the current one. In step T2 the RNC sends an NBAP message to the first Node 402a and an NBAP message T3 to the second NodeB 402b. The messages T2 and T3 may be sent in either order or generally at the same time. These messages are as previously described. As can be seen, in TTI 1, the UE sends CQI0 (for cell a) on the HS-DPCCH followed by the CQI 1 (for cell b). This is respectively referenced T4 and T5.

In TTI 2, the UE 400 sends to the second NodeB 402b CQI2 (for cell c) and CQI3 (for cell d), respectively referenced T6 and T7. Again, these CQIs are sent on the HS-DPCCH.

In TTI 3, the UE sends the next CQI0 and CQI1 to the first NodeB 402a (respectively referenced T8 and T9.) Likewise in TTI 4, the UE 400 sends to the second NodeB 402b CQI 2 and CQI 3, respectively referenced T10 and T12. This is continued as long as required. Thus, CQI 0 maps to cell A, CQI 1 maps to cell B, CQI 2 maps to cell C and CQI 3 maps to cell D. Thus, the CQIs associated with the same NodeB are clustered together—CQI 0 and 1. Likewise, CQI 2 and CQI 3 which are associated with the second NodeB 402b are clustered together.

In some embodiments, the buffer is reset in order to take into account the new configuration. For example, the HARQ (hybrid automatic repeat request) buffer may be reset.

In some embodiments, it may be harder to determine which cells should be clustered. For example, this may be where the cells are not geographically overlapping or are in RRH (remote radio head) deployments where the controlling NodeB may be harder to determine. However, in some embodiments cells which should be clustered may have a common scrambling code. This may be used as a criteria alternatively or additionally to cluster the cells and associated CQIs. Alternatively or additionally, the frame synchronisation number may be used to sort or cluster CQIs. Cells which should be clustered may have frame synchronisation.

Alternatively or additionally, explicit CQI position indexing may be sent by the RNC to the NodeBs and the UEs. Alternatively or additionally a group (cell-NodeB mapping) index may be used.

In some embodiments, the clustering or ordering control may take place in the RNC. However, in alternative embodiments, this may be done at least partially in one or more NodeBs.

The NodeBs will have the same understanding of cell clustering as the UE and/or know which CQI positions they need to read. This knowledge may be obtained by the NodeBs in any suitable way. For example, the NodeBs may have this information transmitted to it, by determining how many cells are configured, or by indicating the CQI format and indices of the CQI positions to read. This information may be provided by the RNC In some embodiments, the NodeBs do not need to know the configuration of the other NodeB.

In one possible implementation the CQI position or group index may be signalled to the UE as a part of the "Downlink secondary cell info FDD" IE.

Reference is made to FIG. 9 which shows the signal flow according to another embodiment. In the arrangement shown in FIG. 9, in step A1, the RNC sends to the user equipment the RRC message downlink secondary cell information FDD. This message indicates that the UE shall continue with the current configuration of cells a and c but provides new configuration information for cells b and d.

In step A2, the UE will rearrange the CQI mappings. In step A3, the RNC will send an NBAP message to the first NodeB 402a. In step A4, the RNC will send to the second NodeB 402b a NBAP message. It should be appreciated that steps A3 and A4 may take place in either order and/or in parallel. In some embodiments, steps A2, A3 and A4 may generally be carried out at the same time. The NBAP messages may be as previously described.

In step A5 the UE sends CQI 0 on the HS-DPCCH to the first NodeB 402a. In that same TTI, and as referenced A6, the second CQI 1 is sent to the first NodeB 402a. In the second TTI, CQI 2 and CQI 3 are sent on the HS-DPCCH to the second NodeB 402b. This is respectively referenced A7 and A8. This provides a similar cell mapping to that described in relation to FIG. 8.

The user equipment may use any suitable criteria for re-arranging the CQI mapping to ensure that the CQI values for a particular cell are clustered together. In one embodiment, the UE may use the scrambling and/or cell timing as criteria for clustering. In the case of the aggregation of more than two cells per scrambling code, the order of the CQIs may follow the RRC configurations of the relevant cells.

In another scenario, it is assumed that the CQIs are not sorted in TTIs according to NodeBs and/or the UE knows which slots belong to which NodeB. With dynamic carrier deactivation by one Node, the UE may repeat other CQIs belonging to the same NodeB in place of the deactivated cell or DTX (discontinues transmission). The UE may do so, depending on whether the deactivated cell slot is reported in a different TTI. With this option, the UE has been informed about the mapping of the CQIs to NodeBs. In other words, the UE knows which CQI is associated with which NodeB. This embodiment may allow the repetition of CQIs when in the same TTI and discontinuous transmission when in separate TTIs. In some embodiments, the disadvantage of delaying a CQI by repeating it in the next TTI is avoided while limiting UE uplink peak power is also enabled. In some embodiments where limiting peak power is an issue, this allows the repetition of one CQI over two TTIs.

For dual HS-DPCCH the knowledge of cell to HS-DPCCH mapping may be required.

In the embodiments shown in FIG. 8 or 9 or otherwise discussed, the HS-DPCCH may be the same or different.

In proposal one, some embodiments may provide an advantage in reducing the frequency at which a NodeB needs to update the CQI information of a particular MF UE. The ACK information is sent in every TTI so when there is no downlink transmission by the particular NodeB and hence no expected ACK, the NodeB may opt to completely ignore TTIs configured for other NodeBs.

Concatenated CQIs are CQIs that are transmitted sequentially in time, or a concatenated CQI value is formed by placing different CQI values one after the other. In some embodiments PCI is used. PCI is precoding control information which indicated which precoding matrix best matches the channel conditions at the UE. PCI and CQI reports may be concatenated and coded into a block code. There may be type A reports where there is a plurality of streams and type B reports where there is a single stream.

Concatenation is different to a CQI value that may be formed by jointly coding other CQIs. In some embodiments, an advantage of grouping CQIs belonging to one NodeB may be achieved when NodeB specific uplink control power for CQIs is implemented. NodeB specific power settings for the UL control channel are presently not specified, but it is conceivable that it will be introduced. In case of grouping the CQIs of one NodeB the required power for the CQIs will not vary across the slots where they are sent which helps with interference estimation algorithms, but also transmit power characteristics.

In case of grouping of CQIs according to NodeBs, the joint coding of CQI over more than one slot becomes feasible more often, helping UL link budget.

Some embodiments may be used for example with the LTE systems. In LTE, strong variation in signal power may be disadvantageous for signal quality. Accordingly, in some embodiments, the CQIs may be arranged in a fashion that minimises variations.

Embodiments may be used where every cell may have its own transmit power for its CQI.

Embodiments may be used with MIMO (multiple input multiple output) CQI constellations.

In some embodiments, the set of CQIs may be larger than the set of cells. This may be for example for MIMO transmissions where there may be a plurality of CQIs for one cell.

In some embodiments, the cells of the assisting NodeB may be treated as secondary cells. In some embodiments, co-ordination is required for inter-NodeB multiflow. In some embodiments, deactivating all cells of the assisting NodeB would be limited to non-primary frequencies.

In embodiments a new CQI format is introduced such that CQIs retain their position and the CQIs of deactivated cells are discontinuously transmitted. Dynamic cell deactivation is disabled and the network may adopt CQI formats based on explicit configuration of SF-DC or DF-4C or their variants.

In some embodiments, deactivation is limited to either the assisted or assisting NodeB. This may be done by for example telling either of the NodeBs the maximum amount of cells it can deactivate.

It should be appreciated that in the described embodiments, the TTIs used by a UE to send to the two NodeBs have been adjacent in time. In alternative embodiments, the TTIs may separate in time. In the embodiments shown, the TTIs to the first and second NodeBs are alternate. It should be appreciated that any other transmission pattern for the TTIs may be used in alternative embodiments.

It should be noted that the embodiments have been described in the context where the sender of packets is an RNC and the receiver of packets is a user equipment. It should be appreciated that embodiments may also be used where the user equipment is sending via two or more paths or cells to a destination. That destination may be an RNC.

In some embodiments, the function described in relation to the RNC may be provided at least partially by a base station. For example, where two or more base station sites are co-located, the base station may have an associated controller which is able to control the transmission to, for example, a user equipment.

In some embodiments, rules are proposed for the UL control for Multi flow that allow the use of the same TTI-format for, for example, SF-DC and DF-4C and their variants while still allowing for dynamic cell activation/deactivation. One proposal is based on current higher layer signalling, and another proposal assumes that additional information of CQI-NodeB mapping is provided by RNC. Some embodiments have a single composite HS-DPCCH channel.

In some multicarrier CQI reporting schemes, it may be assumed that the primary serving cell CQI is put as $CQI_0$ in the table 1 below. The rest of the CQIs, considered referring to secondary cells ($CQI_1$ through $CQI_3$) are reported in the order they have been configured by RRC. This may also apply to multicarrier configurations for Multi flow.

In one alternative embodiment, there is CQI configuration without cell to NodeB mapping. In one embodiment, the cells of the assisting NodeB may be treated as secondary cells. However, in some embodiments, coordination is provided for inter-NodeB Multi flow, and/or or format changes may be avoided.

In Multi flow, deactivating all HS-DSCH cells of the assisting NodeB may be possible, in case the active set of the assisting NodeB is maintained nevertheless. Maintaining the active set may be used in some embodiments as the UL PC (power control) information is carried on the F-DPCH on the primary frequency.

In some embodiments, a 4-cell CQI format in Multi flow may be used. In some embodiments this may even be for dual cell aggregation (SF-DC).

TABLE 1

| Case | Secondary_Cell_Enabled | MIMO configured in any cell | HS-DPCCH slot format | Secondary_Cell_Active | CQI 1 or PCICQI 1 Type A/B | CQI 2 or PCI/CQI 2 Type A/B | CQI 1 or PCI/CQI 1 Type A/B | CQI 2 or PCI/CQI 2 Type A/B |
|---|---|---|---|---|---|---|---|---|
| 13 | 3 | No | 1 | 3 | $CQI_0$ | $CQI_2$ | $CQI_1$ | $CQI_3$ |
| 14 | Note 2 | | | 2 | $CQI_0$ | $CQI_2$ Note 3 | $CQI_1$ Note 3 | $CQI_3$ Note 3 |
| 15 | | | | 1 | $CQI_0$ | $CQI_0$ | $CQI_0$ Note 4 | $CQI_0$ Note 4 |
| 16 | | | | 0 | $CQI_0$ | $CQI_0$ | Not Applicable | |

Note 2:
The $CQI_0$ and $PCI/CQI_0$ refer to the serving HS-DSCH cell's CQI and PCI/CQI reports respectively, the $CQI_n$ and $PCI/CQI_n$ refer to the $n^{th}$ secondary serving HS-DSCH cell's reports.

Note 3:
The deactivated secondary cell's CQI or PCI/CQI is not transmitted (DTX'd).

Note 4:
The CQI or the PCI/CQI of the single active secondary cell is transmitted.

Above table illustrates that when deactivating two cells as in case 15, the position of the remaining CQI (e.g. the cell on the primary carrier of the assisting NodeB) may change, as would the transmit powers of both cells' CQIs. The same situation for the CQIs is obtained by deactivating three cells.

A) In some embodiments, a new CQI format is introduced, such that CQIs retain their position, and the CQIs of deactivated cells are DTX'd, just as in case 14, only now for two cells. This may provide a unified format for both, SF-DC and DF-4C, based on the quad-carrier CQI formats, with only a minor extension to the dual-cell case 15, while at the same time may avoid RRC signalling or other cell-deactivation coordination.

B) In some embodiments, dynamic cell de-activation is disabled, and the network may adopt CQI formats based on explicit configuration of SF-DC or DF-4C or their variants.

C) In some embodiments, deactivation is limited to either the assisted or assisting NodeB, such that case 15 is prohibited. This could be done by telling either of the NodeBs the maximum amount of cells it can deactivate.

Table 2 below shows CQI formats for SF-DC and DF-4C, when no CQI-NodeB mapping is provided.

In some embodiments, in the case CQIs are not grouped according to NodeBs, 4-carrier CQI formats are used. In case of cell-deactivation the CQI position is kept and the CQI is DTx'd as shown in table 2.

In one embodiment, there are no changes are done to the way link configurations are communicated by the RRC, and mapped to CQI configurations.

Alternatively, the CQIs of cells may be grouped according to how they belong to NodeBs. To do so, the link configuration by RNC to UE has a field telling which NodeB the link is going to. Then the UE would be able to place the CQIs of the assisted NodeB into the first TTI, and those of the assisting NodeB into the second. This would enable the NodeBs to ignore the other TTI, and apply CQI formats as they are known for DC HSDPA in each TTI, in case of DF-4C as well as SF-DC which would be treated as single carrier in each NodeB.

An example of possible Multi flow CQI formats may be as shown in Table 3 which only shows the first TTI of CQI reports, while the second TTI belonging to the other NodeB would look similar.

| Case | Secondary_Cell_Enabled | MIMO configured in any cell | HS-DPCCH slot format | Secondary_Cell_Active | CQI 1 or PCICQI 1 Type A/B | CQI 2 or PCI/CQI 2 Type A/B | CQI 1 or PCI/CQI 1 Type A/B | CQI 2 or PCI/CQI 2 Type A/B |
|---|---|---|---|---|---|---|---|---|
| 13 | 3 | No | 1 | 3 | $CQI_0$ | $CQI_2$ | $CQI_1$ | $CQI_3$ |
| 14 | Note 2 | | | 2 | $CQI_0$ | $CQI_2$ Note 3 | $CQI_1$ Note 3 | $CQI_3$ Note 3 |
| 15_new | | | | 1 | $CQI_0$ | $CQI_2$ Note 3 | $CQI_1$ Note 3 | $CQI_3$ Note 3 |
| 16_new | | | | 0 | $CQI_0$ | $DT_x$ | $DT_x$ | $DT_x$ |

Note 2:
The $CQI_0$ and $PCI/CQI_0$ refer to the serving HS-DSCH cell's CQI and PCI/CQI reports respectively, the $CQI_n$ and $PCI/CQI_n$ refer to the $n^{th}$ secondary serving HS-DSCH cell's reports.

Note 3:
The deactivated secondary cell's CQI or PCI/CQI is not transmitted (DTX'd).

| Similar to Case | Secondary_Cell_Enabled NodeB 1 | MIMO configured in any cell | HS-DPCCH slot format | Secondary_Cell_Active | CQI or PCI/CQI report NodeB 1 CQI or PCI/CQI Type A/B |
|---|---|---|---|---|---|
| 1 | 0 | No | 0 | 0 | CQI |
| 2 | SF-DC or DF-3C | Yes | 0 | 0 | PCI/CQI |
| 3 | 1 | No | 0 | 1 | $CQI_0$ & $CQI_1$ |
| 4 | DF-3C or DF-4C | | 0 | 0 | $CQI_0$ |
| 18 | | Yes, Note 1 | 1 | 1 | $PCI/CQI_0$  $PCI/CQI_1$ |
| 19 | | | | 0 | $PCI/CQI_0$  $PCI/CQI_0$ |

Note 1:
If the UE is configured in MIMO mode in at least one cell, but not in all cells, a CQI value is reported instead of PCI/CQI value for the non-MIMO cell(s).

In one example, a DF-4C configuration without MIMO may look as follows:

| nodeB 1 | nodeB 2 (assisting) |
|---|---|
| $CQI_0$ & $CQI_1$ | $CQI_2$ & $CQI_3$ |

With MIMO enabled in cell 2 of nodeB2 this example turns into

| nodeB 1 | nodeB 2 (assisting) | |
|---|---|---|
| $CQI_0$ & $CQI_1$ | $PCI/CQI_2$ | $CQI_3$ |

MF CQI based on 4-cell CQI formats according to one embodiment is shown in the table below. This table proposed CQI format when grouping CQIs belonging to one NodeB in one TTI Or an DF-3C with MIMO in NodeB 1 as

| nodeB 1 | | nodeB 2 (assisting) | |
|---|---|---|---|
| $PCI/CQI_0$ | $PCI/CQI_0$ | $CQI_1$ | $CQI_2$ |

Further, it may be technically possible to have no HS-DSCH cell configured in an assisting NodeB, even though the NodeB is in the active set. In that case we propose to DTx the CQIs of that NodeB.

The UE may be provided by the RNC with information as to which CQI belongs to which NodeB When the UE has been provided by RNC with CQI-NodeB mapping, the UE may group the CQIs of one NodeB adjacent to each other.

The format for grouped CQIs may follow Table above, that is shall follow 4-carrier formats for a single NodeB In case of cell deactivation the slot can be used for repetition of CQIs belonging to the same NodeB.

| Similar to Case | Secondary_Cell_Enabled NodeB 1 | MIMO configured in any cell | HS-DPCCH slot format | Secondary_Cell_Active | NodeB 1 | |
|---|---|---|---|---|---|---|
| | | | | | CQI 1 or PCI/CQI 1 Type A/B | CQI 2 or PCI/CQI 2 Type A/B |
| 18 | 1 | Note 1 | 1 | 1 DF-3C or DF-4C | $PCI/CQI_0$ | $PCI/CQI_1$ |
| 19 | | | | 0 SF-DC or DF-3C | $PCI/CQI_0$ | $PCI/CQI_0$ |

Note that above table resembles table 2, with the difference that repetition is enabled instead of DTXing, and a CQI grouping according to NodeBs is provided. Using repetition enables a higher link budget for the report An SF-DC setup for example could be reported as

| nodeB 1 | | nodeB 2 (assisting) | |
|---|---|---|---|
| $CQI_0$ | $CQI_0$ | $CQI_1$ | $CQI_1$ |

Various different embodiments have been described. It should be appreciated that one or more embodiments may be used at least partially in combination.

Various different methods have been shown. It should be appreciated that in some embodiments one or more of the method steps may be combined into a single step. In some embodiments, one or more of the method steps may be changed in terms of order. In some embodiments, one or more steps may be omitted. In some embodiments, one or more additional steps may be included.

One or more of the steps of any of the methods may be implemented using a respective arrangement. The respective arrangement may comprise circuitry and/or may be performed by one or more processors run computer code. One or more arrangements may be provided by common circuitry and/or the same one or more processors as used by another arrangement. Where one or more processors are provided, these processors may operate in conjunction with one or more memories.

Some embodiments have described one or more steps being performed in a UE. It should be appreciated that in other embodiments, one or more of those steps may be performed in a node such as a base station and/or RNC. Likewise in some embodiments, one or more steps have been described as being performed by a base station. In other embodiments, one or more of those steps may be performed in a UE and/or RNC. Some embodiments have described one or more steps being performed in a RNC. It should be appreciated that in other embodiments, one or more of those steps may be performed in a base station and/or UE The required data processing apparatus and functions of a base station apparatus, user equipment and RNC may be provided by means of one or more data processors. These may perform one or more of the method steps of a respective method.

The data processors may be of any type suitable to the local technical environment, and may include one or more of general purpose computers, special purpose computers, microprocessors, digital signal processors (DSPs), application specific integrated circuits (ASIC), gate level circuits and processors based on multi core processor architecture, as non limiting examples. The data processing may be distributed across several data processing modules. A data processor may be provided by means of, for example, at least one chip.

Appropriate memory capacity can also be provided in the relevant devices. The memory or memories may be of any type suitable to the local technical environment and may be implemented using any suitable data storage technology, such as semiconductor based memory devices, magnetic memory devices and systems, optical memory devices and systems, fixed memory and removable memory.

In general, the various embodiments may be implemented in hardware or special purpose circuits, software, logic or any combination thereof. Some aspects of embodiments may be implemented in hardware, while other aspects may be implemented in firmware or software which may be executed by a controller, microprocessor or other computing device, although embodiments are not limited thereto. While various aspects of the embodiments may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Some embodiments may be implemented by computer software executable by one or more data processors in conjunction with one or more memories of a base station, UE or RNC.

One or more steps of a method of an embodiment may be performed when computer executable instructions are run on one or more processors.

Further in this regard it should be noted that any blocks of the logic flow as in the Figures may represent program steps, or interconnected logic circuits, blocks and functions, or a combination of program steps and logic circuits, blocks and functions.

The software or computer executable instructions may be stored on such physical media as memory chips, or memory blocks implemented within the processor, magnetic media such as hard disk or floppy disks, and optical media such as for example DVD and the data variants thereof, CD.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims.

The invention claimed is:

1. A method comprising:
causing first reference information associated with a first serving cell and second reference information associated with a second serving cell grouped to a first base station to be sent to the first base station in a first time interval and causing at least third reference information associated with at least one assisting cell to be sent to a second base station in a different time interval.

2. The method of claim 1, comprising receiving information on said cells, said information indicating which cells belong to which base station.

3. The method of claim 2 comprising receiving information on a position for said reference information in a channel.

4. The method of claim 2, comprising receiving information indicating an order for said cells.

5. The method of claim 1, comprising causing said reference information to be reported in an order in which an associated cell has been configured.

6. A computer program product embodied on a non-transitory computer-readable medium in which a computer program is stored comprising computer executable instructions which when executed by a computer is configured to provide instructions to control or carry out the method of claim 1.

7. A method comprising:
causing information to be sent to a user equipment to control reference information reporting by said user equipment such that said user equipment report reference information associated with a first serving cell and second reference information associated with a second serving cell grouped to a first base station to be sent to the first base station in a first time interval and causing at least third reference information associated with a at least one assisting cell to be sent to a second base station in a different time interval.

8. An apparatus comprising:
at least one processor and at least one memory including computer program code, wherein the at least one memory and the computer code are configured, with the at least one processor, to cause the apparatus to at least perform the following:
causing first reference information associated with a first serving cell and second reference information associated with a second serving cell grouped to a first base station to be sent to the first base station in a first time interval and causing at least third reference information associated with at least one assisting cell to be sent to a second base station in a different time interval.

9. The apparatus of claim 8, wherein the at least one memory and the computer code are be configured, with the at least one processor, to cause the apparatus to at least further perform the following: receiving information on said cells, said information indicating which cells belong to which base station.

10. The apparatus of claim 8, wherein the at least one memory and the computer code are be configured, with the at least one processor, to cause the apparatus to at least further perform the following: receiving information on a position for said reference information in a channel.

11. The apparatus of claim 8, wherein the at least one memory and the computer code are be configured, with the at least one processor, to cause the apparatus to at least further perform the following: causing the apparatus to cause said reference information to be reported in an order in which an associated cell has been configured.

12. The apparatus of claim 8, wherein the at least one memory and the computer code are be configured, with the at least one processor, to cause the apparatus to at least further perform the following: causing the apparatus to determine which cells are associated with which base station.

13. The apparatus of claim 8, wherein one or more of scrambling information, cell timing information or information identifying an associated base station is used in order to determine which cells are associated with which base station.

14. The apparatus of claim 8, wherein said reference information comprises channel quality indicator information.

15. The apparatus of claim 8, wherein the at least one memory and the computer code are be configured, with the at least one processor, to cause the apparatus to at least further perform the following: causing the apparatus to cause said reference information to be sent on a control channel.

16. The apparatus of claim 8, wherein the at least one memory and the computer code are be configured, with the at least one processor, to cause the apparatus to at least further perform the following: causing the apparatus to receive information configured to reconfigure one or more links with one or more cells.

17. The apparatus of claim 8, wherein the at least one memory and the computer code are be configured, with the at least one processor, to cause the apparatus to at least further perform the following: causing the apparatus to receive information indicating an order for said cells.

18. The apparatus of claim 8, wherein the at least one memory and the computer code are be configured, with the at least one processor, to cause the apparatus to at least further perform the following: causing the apparatus, responsive to deactivation of one or more of said cells, to cause a discontinuous transmission to be provided instead of reference information associated with said deactivated cell.

19. An apparatus comprising:
at least one processor and at least one memory including computer program code, wherein the at least one memory and the computer code are configured, with the at least one processor, to cause the apparatus to at least perform the following:
causing information to be sent to a user equipment to control reference information reporting by said user equipment such that said user equipment report reference information associated with a first serving cell and second reference information associated with a second serving cell grouped to a first base station to be sent to the first base station in a first time interval and causing at least third reference information associated with a at least one assisting cell to be sent to a second base station in a different time interval.

\* \* \* \* \*